United States Patent [19]
Enders

[11] Patent Number: 4,822,065
[45] Date of Patent: Apr. 18, 1989

[54] COLLAPSIBLE CARGO CARRIER

[76] Inventor: Irvin D. Enders, 11511 W. 99th St., Overland Park, Kans. 66214

[21] Appl. No.: 80,885

[22] Filed: Aug. 3, 1987

[51] Int. Cl.⁴ .............................................. B62B 1/12
[52] U.S. Cl. ........................... 280/47.331; 280/414.2; 280/40; 280/652; 114/344
[58] Field of Search ................... 280/47.13 B, 47.13 R, 280/40, 414.1, 414.2, 639, 652, 39, 641; 114/344

[56] References Cited

U.S. PATENT DOCUMENTS

| | | | |
|---|---|---|---|
| 2,818,268 | 12/1957 | Johnson | 280/47.13 B |
| 3,098,245 | 7/1963 | Corey et al. | 114/344 |
| 3,551,000 | 12/1970 | Griswold | 114/344 |
| 3,603,608 | 9/1971 | Kirkpatrick | 280/47.13 R |
| 3,917,083 | 11/1975 | Carn | 280/414.1 |
| 4,327,933 | 5/1982 | Tuggle | 280/47.13 B |
| 4,601,481 | 7/1986 | Maurice | 114/344 |
| 4,706,983 | 11/1987 | Griswold | 280/47.13 B |

FOREIGN PATENT DOCUMENTS

| | | | |
|---|---|---|---|
| 1033381 | 6/1978 | Canada | 280/652 |
| 201935 | 10/1908 | Fed. Rep. of Germany | 280/40 |
| 2654901 | 6/1978 | Fed. Rep. of Germany | 280/47.13 B |
| 924384 | 4/1947 | France | 280/47.13 R |
| 1001323 | 8/1965 | United Kingdom | 280/414.2 |
| 1528582 | 10/1978 | United Kingdom | 280/40 |

*Primary Examiner*—David M. Mitchell
*Assistant Examiner*—Brian L. Johnson
*Attorney, Agent, or Firm*—Kokjer, Kircher, Bradley, Wharton, Bowman & Johnson

[57] ABSTRACT

A collapsible cargo carrier is the subject of the present invention. The carrier comprises a rigid framework for supporting cargo and an axle and wheel assembly for moving the cargo over a surface. A generally rectangular framework supports the cargo and is coupled with the axle by triangular supports which are releasably hinged to the cargo carrying framework. By removing two locking pins, the axle is released from the framework and the triangular supports can be collapsed against the cargo carrying portion of the framework. Mounting brackets are provided for storing the axle and wheel assembly on the side of the framework when the other components have been collapsed. Accessories are provided for accommodating larger loads and for facilitating movement of loads by providing elongated handles on the carrier.

4 Claims, 2 Drawing Sheets

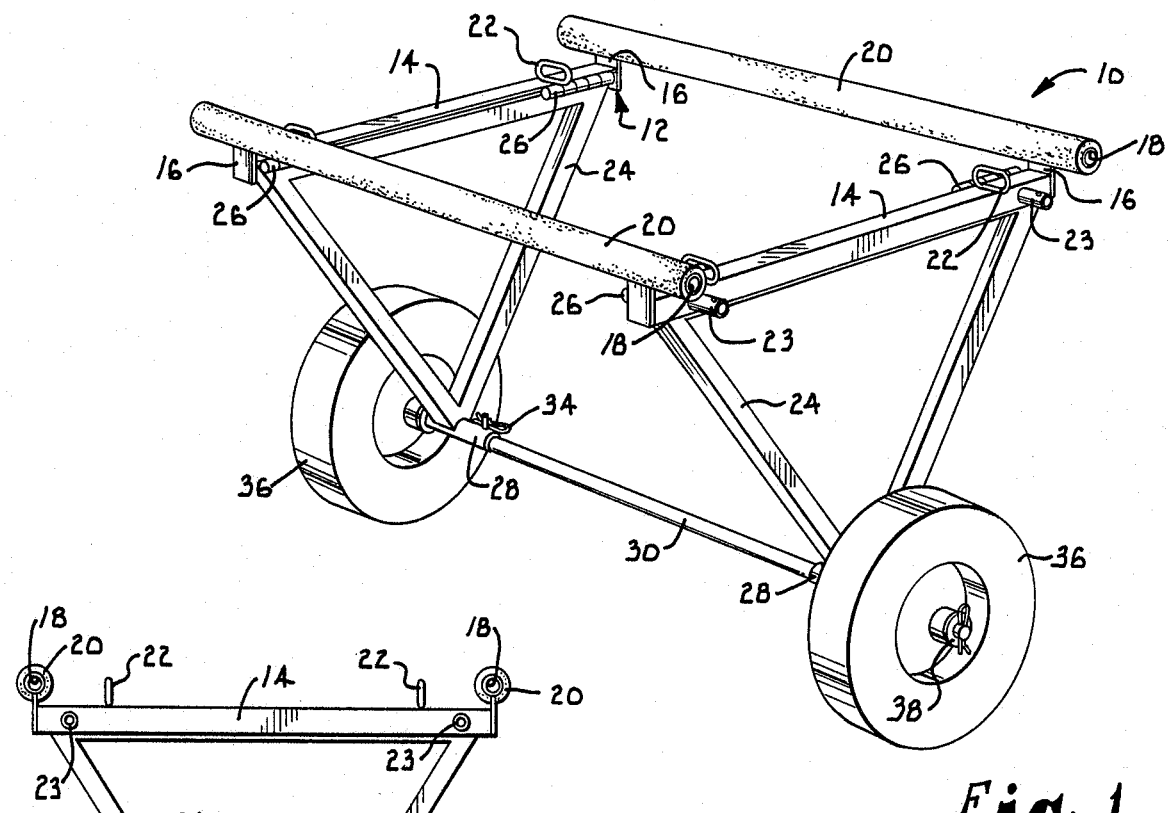
Fig. 1.
Fig. 2.
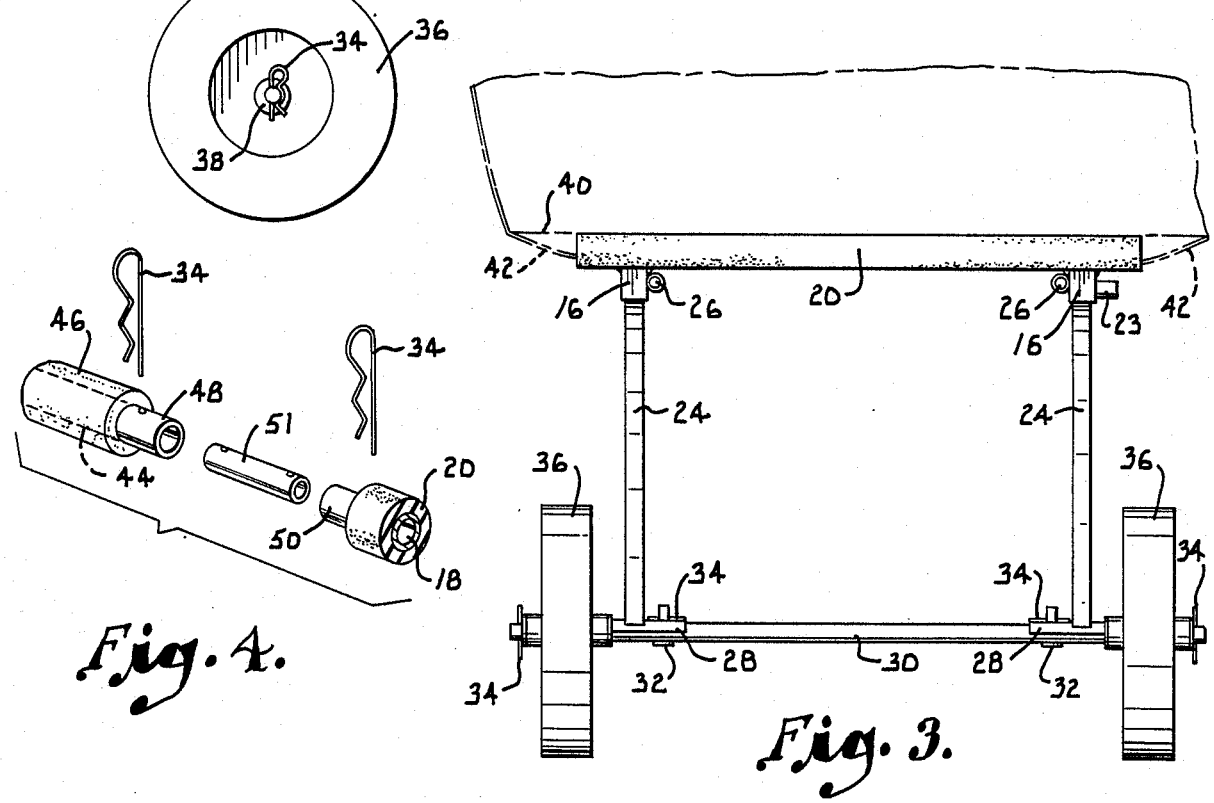
Fig. 4.
Fig. 3.

COLLAPSIBLE CARGO CARRIER

This invention relates generally to cargo carrying apparatus and, more particularly, to a manually operable collapsible carrier which can be used to move heavy loads over short distances or large bulky objects such as boats over long distances and is collapsible for transportation and storage purposes.

Various types of two wheel carts have long been employed for moving objects. The present invention represents an improvement over these prior art devices in providing a cart that is collapsible and can be easily modified for a variety of purposes.

It is, therefore, a primary object of the present invention to provide a two wheel cargo carrier which is collapsible and is specially designed for carrying boats and other bulky cargo.

An important aim of the invention is to provide a collapsible two wheel carrier which can be folded for ease in transport and yet quickly assembled prior to usage.

One of the objectives of my invention is to provide a collapsible two wheel carrier which is capable of supporting heavy loads and may be used on hard surfaced roads or over relatively rough terrain.

Another important object of the invention is to provide a collapsible two wheel carrier which can be adapted for use in moving both flat bottom and V-hull boats.

It is also one of the objects of the invention to provide a two wheel cargo carrier which is constructed to utilize the load itself as a tongue for the two wheel carrier.

Another one of the objectives of my invention is to provide a collapsible two wheel cart which can accommodate wheels of different size and design for travel over different surfaces.

It is also an important aim of my invention to provide a collapsible two wheel carrier which can accommodate side bar handles to transform the carrier into a rickshaw.

Other objects of the invention will be made clear or become apparent from the following description and claims when read in light of the accompanying drawing, wherein:

FIG. 1 is a perspective view of the collapsible two wheel cart according to the present invention;

FIG. 2 is an elevational view of one side thereof;

FIG. 3 is an elevational view taken from one end of the collapsible carrier;

FIG. 4 is an exploded view of a portion of an alternative embodiment of the invention;

Figure 5:
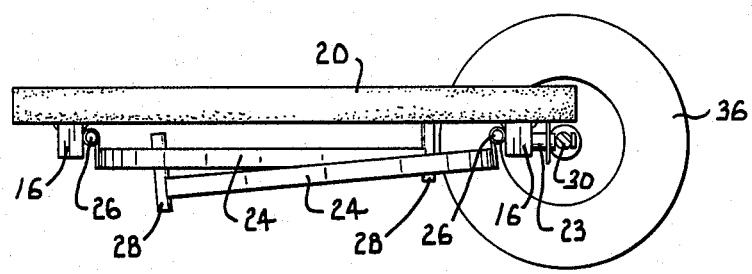
FIG. 5 is an elevational view of the carrier according to the present invention in its collapsed form.

Referring initially to FIG. 1 of the drawing, the preferred form of the carrier according to the present invention is shown and designated generally by the numeral 10. Carrier 10 includes a rigid framework 12 having first and second angle iron cross pieces 14 with risers 16 on opposite ends of each cross piece. Rigid with risers 16 are first and second tubular supports 18 which extend in a direction transverse to cross pieces 14 and cooperate with the latter to complete the rigid rectangular framework. Foam rubber padding 20 is formed around each tubular support 18 to provide a cushion surface for a load resting on the framework. Rigid oval shaped ring members 22 are welded or otherwise rigidly secured in spaced apart relationship on the top surface of each cross piece 14 so as to present an eyelet for tying down a load to the carrier. Rigidly secured to one of the cross pieces 14 are first and second apertured tubular mounting brackets 23 for purposes to be made clear hereinafter.

First and second triangular supports 24 are coupled with framework 12 on opposite sides thereof through hinges 26. Each triangular support 24 presents an apex at the bottom of the support to which is rigidly secured an elongated saddle 28. Saddles 28 receive axle member 30 which has mounting pins 32 welded thereto for alignment with appropriate size apertures (not shown) in saddles 28. Axle 30 is then releasably secured to the saddles by keeper pins 34. Wheels 36 are releasably secured to axle 30 by additional keeper pins 34 in cooperation with washers 38.

In use, the carrier 10 is placed in its assembled mode as illustrated in FIG. 1 with supports 24 perpendicular to framework 12 and a load is mounted on the cushioned foam rubber surface 20. The carrier is especially adapted for moving relatively large bulky items such as a flat bottom boat illustrated schematically and designated by the numeral 40 in FIG. 3. When the boat is placed on the framework, straps 42 (FIG. 3) are employed to hold the boat to the framework utilizing the eyelets of ring members 22 as ties or, if hooks are provided in straps 42, these hooks may be secured in the eyelets of ring members 22. The design of the carrier allows the bow of the boat (not shown) to serve as a tongue for moving the carrier and its load over a surface. It will be appreciated that different types and sizes of wheels 36 may be employed depending upon the load being moved and the surface over which the moving takes place. In some instances, relatively small hard rubber wheels may be employed while in other cases larger pneumatic tired wheels are desired.

Figure 6:
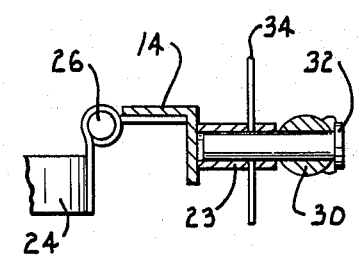
FIG. 6 is an enlarged cross-sectional view illustrating the manner of storing the axle on the side of the framework for transport.

When the carrier 10 is to be stored or transported, it is desirable to place it in its collapsed condition as illustrated in FIG. 5. This is easily and quickly accomplished by pulling keeper pins 34 to release the axle and wheel assembly from saddles 28. The axle may then be mounted on the side of the framework utilizing the apertured tubular mounting brackets 23 aforedescribed. As illustrated in FIG. 6, pins 32 which are secured to axle 30 are received by the tubular mounting brackets and keeper pins 34 are then inserted through the aligned apertures in the bracket and pin 32 so as to mount axle 30 in its stored position. Manifestly, if desired, wheels 36 can be removed from the axle.

With axle 30 released from saddles 28, triangular supports 24 are free to pivot about hinges 26 into the collapsed position shown in FIG. 5 where they are generally parallel to framework 12. Straps 42, an elastic cord, or other suitable device, may be utilized if desired to hold the carrier in its collapsed position.

Figure 7:
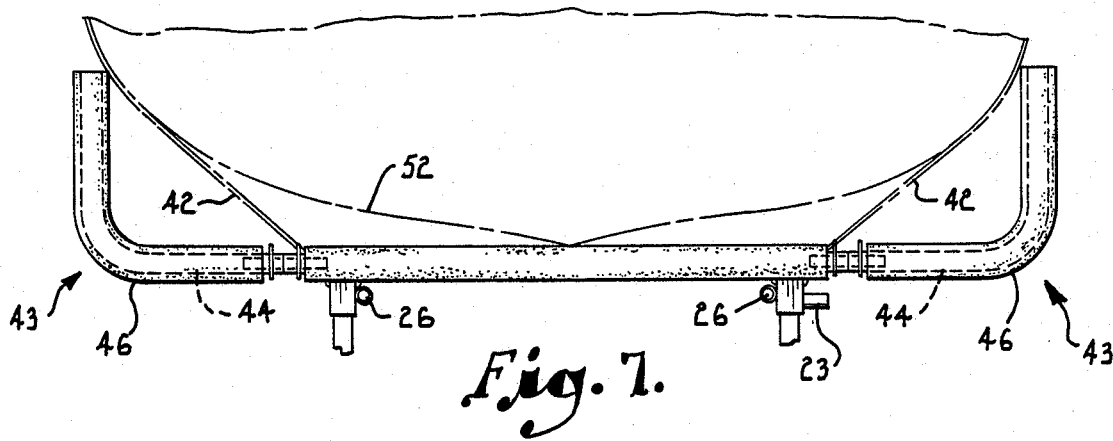
FIG. 7 is an elevational view of an alternative form of the invention wherein side arms are utilized to provide a carrier for a V-hull boat.

An alternative embodiment of the invention is illustrated in FIG. 7 and comprises an accessory extension of framework 12 which accessory is designated generally by the numeral 43. Accessory extension 43 includes four L-shaped tubular members 44 which are mounted on opposite ends of tubular supports 18. Two of tubular members 44 are shown in FIG. 7 in broken lines. Each tubular member is surrounded by a covering 46 of foam rubber.

The accessory extension 43 includes means for releasably securing the arms to framework 12 which means is shown in the exploded view of FIG. 4. Each tubular member 44 is provided with a rigid tubular nipple 48 which extends beyond the foam rubber cover 46. Nipple 48 is provided with a through aperture for receiving a keeper pin 34. Similarly, each end of each tubular support 18 is provided with a nipple extension 50 also provided with a through aperture (not shown) for receiving a keeper pin 34. A connecting tube 51 is of a diameter such as to be received within the tubular nipples 48 and connecting tube 51 is also provided with through apertures which align with the apertures in nipples 48 and 50. Insertion of locking pins 34 through the aligned apertures rigidly couples tubular members 44 to the framework to complete the extension.

The accessory extension just described is particularly suited for adapting the carrier 10 for transporting V-hull boats such as the one shown schematically in FIG. 7 and designated by the numeral 52. Straps 42 can again be employed to secure the boat to the carrier.

Figure 8:
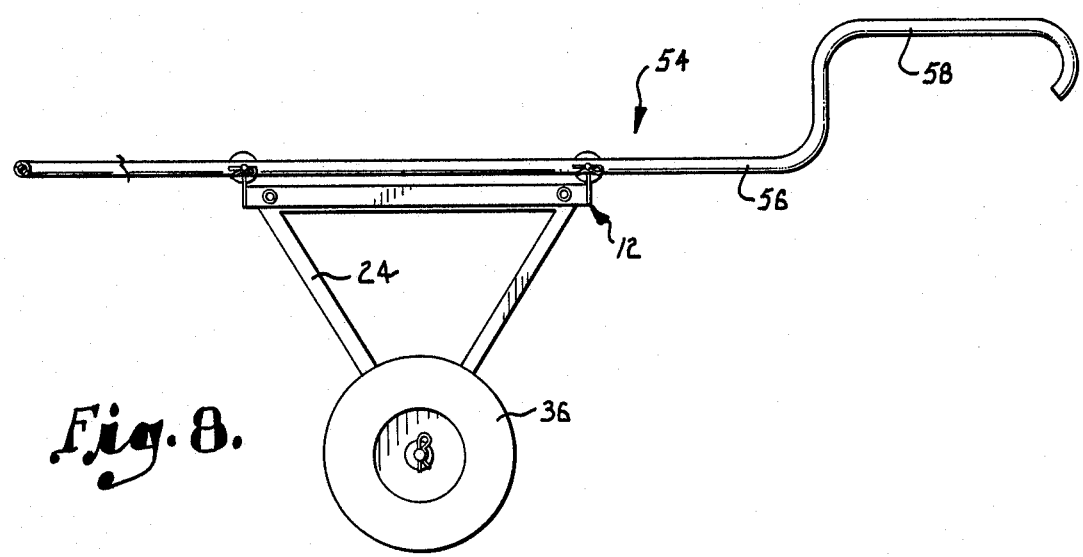
FIG. 8 is a side elevational view of another alternative form of the invention wherein side bars are utilized to transform the collapsible carrier into a rickshaw.

Another alternative embodiment of the invention is illustrated in FIG. 8. In this embodiment, an elongated side bar accessory is designated by the numeral 54 and includes a pair of elongated tubular members 56 which extend from behind framework 12 at one end to in front of the framework at the other end. Tubular members 56 are disposed on opposite sides of the framework 12 and are held in place by nipple extensions 50 of the type shown in FIG. 4 and locking pins 34. Preferably, the tubular members extend behind the framework and then toward each other so that the two tubular members can be connected together to present a unitary platform extension of the framework. The end of tubular members extending forward of framework 12 are configured so as to present handle portions 58 to facilitate movement of the carrier by a person.

It will be appreciated that, with both alternative embodiments of the invention, the carrier can be collapsed into the position illustrated in FIG. 5 for the preferred embodiment so as to facilitate transportation and storage. The accessories are easily removed by pulling locking pins 34 to release the accessories from the framework. It will also be apparent that other accessories can be fitted to the carrier 10 without departing from the spirit and scope of the present invention.

I claim:

1. A collapsible cargo carrier comprising:
    a framework for supporting said cargo in a raised position relative to a surface;
    first and second generally triangular brace members hingedly coupled with said framework on opposite sides thereof and movable from a folded position generally parallel with said framework to a cargo carrying position generally perpendicular to said framework;
    a removable axle extending between and connecting said brace members for supporting said framework and said brace members in said cargo carrying position;
    means for releasably locking said brace members to said axle in said cargo carrying position;
    means on said framework for securing said cargo to the framework;
    first and second wheels adapted to be releasably coupled with said axle means for accommodating rolling movement of said cargo over said surface; and
    means on said framework for mounting said axle when removed from said brace members to accommodate rolling movement of said cargo carrier on said wheels when said triangular brace members are in the folded position.

2. The invention of claim 1, wherein said framework includes cushioned support members extending generally parallel to and above said axle for supporting said cargo when the latter is placed on said framework.

3. The invention of claim 1, wherein there is included a first pair of L-shaped extension arms adapted to be releasably coupled with said framework on opposite sides thereof at one end of said framework and a second pair of L-shaped extension arms adapted to be releasably coupled with said framework on opposite sides thereof at the other end of said framework.

4. The invention of claim 1, wherein there is included first and second elongated tubular members adapted to be releasably coupled with said framework at opposite sides thereof, each of said tubular members extending beyond said framework on opposite ends thereof to present an extended platform surface and also providing means for facilitating manual movement of said carrier.

* * * * *